No. 12,543. REISSUED OCT. 23, 1906.

P. J. COLLINS.

ELECTRIC MOTOR.

APPLICATION FILED APR. 11, 1906.

Witnesses.

Burchard V. Kelley

Helen Alford

Inventor:

Patrick J. Collins.

by Albert G. Davis

Att'y.

UNITED STATES PATENT OFFICE.

PATRICK J. COLLINS, OF SCRANTON, PENNSYLVANIA, ASSIGNOR, BY MESNE ASSIGNMENTS, TO GENERAL ELECTRIC COMPANY, A CORPORATION OF NEW YORK.

ELECTRIC MOTOR.

No. 12,543. Specification of Reissued Letters Patent. Reissued Oct. 23, 1906.

Original No. 655,852, dated August 14, 1900. Application for reissue filed April 11, 1906. Serial No. 311,195.

*To all whom it may concern:*

Be it known that I, PATRICK J. COLLINS, a citizen of the United States, residing at Scranton, in the county of Lackawanna and State of Pennsylvania, have invented certain new and useful Improvements in Electric Motors, of which the following is a specification.

This invention relates to an improved form of motor which may be adapted to a variety of uses, but which is particularly designed for the purpose of propelling and steering automobiles in which the driving-wheels turn independently of each other.

To this end the invention comprises a motor of light construction having a single field-casing with two parallel armatures therein which operate independently and whose shafts may be connected to the independent driving-wheels of the automobile so that said wheels may be driven at the same speed to propel the vehicle in a straight line or at varying speeds for the purpose of turning corners. By means of suitable switches the armatures may be stopped, started, or reversed independently or together, and they may be connected electrically in various ways to suit the requirements of vehicle-work in the same manner as if said armatures were parts of independent motors.

By constructing the motor with two armatures within a single field-casing in the manner hereinafter shown and described, I am enabled to produce a machine having all of the capabilities of two motors, with the additional advantages of a great reduction in weight and size—two very important considerations in automobile operation.

Figure 1:
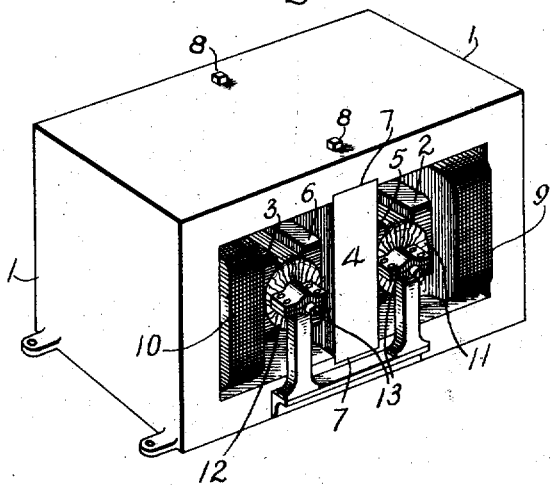
Figure 2:
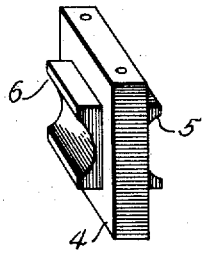
Figure 3:
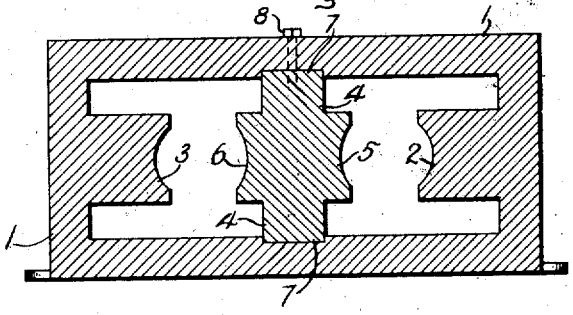

In the accompanying drawings, Figure 1 is a perspective view of a motor constructed in accordance with my invention. Fig. 2 is a similar view of the partition which extends centrally through the motor-casing, dividing it into two compartments and also forming a part of the magnetic circuit for both armatures. Fig. 3 is a transverse section through the field of the motor shown in Fig. 1; and Fig. 4 is a similar section through the field of a modified form of motor, the field-coils being shown in position.

Referring to the drawings, Figs. 1, 2, and 3, 1 indicates a field-casing, which, as shown, consists of a hollow rectangular frame having inwardly-projecting pole-pieces 2 and 3 at its opposite sides and a central partition 4 extending through the interior of the casing midway between the pole-pieces 2 and 3. The partition 4 is formed with pole-pieces 5 and 6 projecting from its opposite sides, said pole-pieces being arranged opposite the pole-pieces 2 and 3, respectively. The casing 1 is formed with interior grooves or channels 7 at the top and bottom, and the partition 4 is made separate from the casing and adapted to fit within these grooves, being normally held in place by means of suitable bolts 8, passing through the casing. The pole-pieces 2 and 3 are longer than their opposing pole-pieces 5 and 6, and the field-coils 9 and 10 are wound on said pole-pieces 2 and 3, respectively. The armatures 11 and 12 are mounted in suitable bearings 13. It will be seen that with this construction when the coil 9 is energized a consequent pole will be set up in the pole-piece 5 and that when the coil 10 is energized a consequent pole will be set up in the pole-piece 6 and that the current in either of the coils may be varied in strength or reversed, causing a corresponding variation or reversal of the magnetic poles in one compartment without effecting the poles in the other compartment, and the armatures will of course act independently of each other. The partition 4 is made removable for the purpose of permitting the coils 9 and 10 to be easily inserted or removed. It will be noted that the magnetic circuit through each half of the field-casing is very short. I might arrange the longer pole-pieces upon the removable partition and the shorter ones upon the ends of the casing; but the construction shown is preferable, as it is desirable to make the partition light, so that it may be easily handled, and I also prefer this construction as being more efficient.

Figure 4:
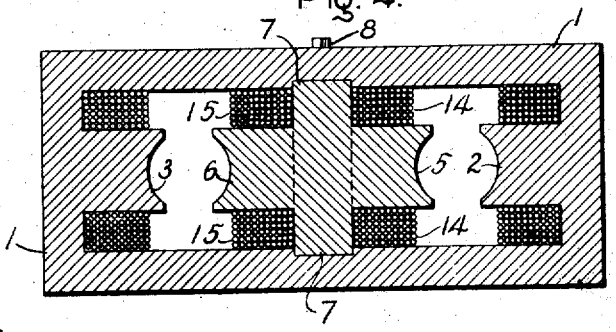

In Fig. 4 I have shown a modified form of motor designed for heavy work. In this figure the construction of the casing and the partition is the same except that the pole-pieces 5 and 6 are extended to provide room for additional field-coils 14 and 15.

I have not herein shown the details of the electrical connections or switches for controlling the motors, as it will be readily understood by those skilled in the art that the motors will be connected and controlled in any suitable manner to meet the requirements of the work being done.

It will be obvious that many changes in details may be made without departing from the spirit of my invention.

Without limiting myself to the precise construction shown and described, what I claim, and desire to secure by Letters Patent of the United States, is—

1. An electric motor consisting of a hollow field-frame having inwardly-projecting pole-pieces at its opposite sides, a partition extending across the interior of the frame transversely to the pole-pieces and forming part of the magnetic circuit, said partition having pole-pieces opposing the pole-pieces upon the sides, separate field-coils for each pair of opposing pole-pieces, and an armature between each pair of opposing pole-pieces.

2. An electric motor consisting of a hollow field-frame having inwardly-projecting pole-pieces at its opposite sides, field-coils wound on said pole-pieces, a partition extending across the interior of the frame transversely to the pole-pieces and forming part of the magnetic circuit, said partition having pole-pieces opposing the pole-pieces on the sides, and an armature between each pair of opposing pole-pieces.

3. An electric motor consisting of a hollow field-frame having inwardly-projecting pole-pieces at its opposite sides, field-coils wound on said pole-pieces, a partition extending across the interior of the frame transversely to the pole-pieces and forming part of the magnetic circuit, said partition having consequent pole-pieces opposing the pole-pieces on the sides, and an armature between each pair of opposing pole-pieces.

4. In an electric motor, a hollow field-frame having inwardly-projecting pole-pieces at its opposite sides, and a removable partition extending across the interior of the frame transversely to said pole-pieces and forming part of the magnetic circuit, said partition having pole-pieces opposing the pole-pieces upon the sides, and an armature between each pair of opposing pole-pieces.

5. In an electric motor, a hollow field-frame having inwardly-projecting pole-pieces at its opposite sides, said pole-pieces having coils thereon and a removable partition extending across the interior of the frame transversely to said pole-pieces and forming part of the magnetic circuit, said partition having consequent pole-pieces opposing the pole-pieces upon the sides, and an armature between each pair of opposing pole-pieces.

6. In an electric motor, a field-frame having inwardly-projecting pole-pieces at either side and coils thereon, double consequent pole-pieces arranged between the side pole-pieces and armatures arranged between the consequent pole-pieces and each of the side pole-pieces.

In witness whereof I have hereunto set my hand this 7th day of April, 1906.

P. J. COLLINS.

Witnesses:
THOMAS A. DONAHOE,
SARAH C. VESEY.